United States Patent [19]

Block

[11] 4,339,863

[45] Jul. 20, 1982

[54] LOCK OPENING TOOL

[76] Inventor: Andrew Block, 90 Eton Rd., Thornwood, N.Y. 10594

[21] Appl. No.: 194,994

[22] Filed: Oct. 8, 1980

[51] Int. Cl.$^3$ ........................ B23B 35/00; B23P 19/04

[52] U.S. Cl. ...................................... 29/426.4; 81/3 R

[58] Field of Search ......................... 70/393, 394, 411; 81/3 R; 74/501 R; 29/426.4

[56] References Cited

U.S. PATENT DOCUMENTS

| | | | |
|---|---|---|---|
| 2,344,696 | 3/1944 | Graham | 81/3 R |
| 3,990,301 | 11/1976 | Smith | 74/501 R |
| 4,094,176 | 6/1978 | Hughes | 70/411 |
| 4,261,093 | 4/1981 | Steffen et al. | 29/426.4 |
| 4,307,983 | 12/1981 | Blough | 29/426.4 |

FOREIGN PATENT DOCUMENTS

| | | | |
|---|---|---|---|
| 149743 | 4/1904 | Fed. Rep. of Germany | 70/393 |

*Primary Examiner*—Roscoe V. Parker

*Attorney, Agent, or Firm*—McAulay, Fields, Fisher, Goldstein & Nissen

[57] ABSTRACT

A tool is provided for opening a lock, particularly a mortise cylinder type lock, the plug of which has been drilled out with drill bits available in the art. The lock opening tool, which is inserted into this prepared opening includes a hollow member, preferably a cylindrical tube having an opening along one diameter into which a strip of spring steel is inserted, and an opening along the circumference, at the opposite end of the cylindrical tube, through which the end of the strip of spring steel can be extended, essentially at a 90° angle. In use, the cylinder lock which must be opened without the benefit of a key, for example because of a lost key, is drilled out by using essentially standard means through the cylinder plug, which is a continuation of the hole already started. The lock opening device of the present invention is inserted through the opening, the spring steel inserted, and the extending portion, from the circumference, employed to engage and move the tongue inside the mortise cylinder counterpart lock at the rear of the lock to remove the bolt from the strike plate.

3 Claims, 6 Drawing Figures

LOCK OPENING TOOL

BACKGROUND OF THE INVENTION

It is frequently necessary, for a variety of reasons, to open a locked door, particularly a door locked with a mortise cylinder-type lock, without the benefit of the key designed for that lock. For example, the occupant of the premises may have lost, or temporarily misplaced, the key which operates that mortise cylinder-type lock, but still requires the ability to gain access to the premises. In some circumstances, the occupant of the premises is not available, but public safety officials, such as the police, require access under appropriate authority. In these cases, as well as others, it is necessary to be able to open the door without access to the proper key and, generally, it is desired that this access be accomplished without damage to the door structure or the mortise cylinder counterpart which is inside the door.

In recent years, many locks, such as the Medeco ®, have been developed which are extremely difficult to open without the necessary key. Some of these security type locks, for example, are provided with case hardened steel in various portions of the lock body to inhibit defeating the lock. Even these locks, however, can be opened in the absence of the proper key, employing the device of the present invention.

The cylinder material of cylinder-type locks, because of the requirements in formation of the lock for normal operation, can be drilled out, even if a masonry type bit is required for this drilling operation. Heretofore, however, no tool has been available to allow opening of the lock, except for lock picks which are, for the most part, ineffective on high security mortise cylinder locks. Thus, though partial access might be gained to security type, cylinder locks, the door could still not be opened without actual damage to the door, mortise cylinder lock counterpart within the door, or the door jamb.

While it remains important to prevent unauthorized access to an enclosure when the proper key is not available, it is still important for authorized personnel, including licensed locksmiths and public safety officials to be able to gain access when necessary, and without unnecessary destruction of property. It is to that end that the present invention is directed.

The prior art has dealt with means for decoding the tumbler sequence in a circular key lock, such as in Hughes, U.S. Pat. No. 4,094,176, but such a method is not effective in all high security type mortise locks. Further, though L-shaped insertion devices have been described as, for example, in U.S. Pat. No. 3,990,301, Smith, these are ineffective for opening a lock from which the plug has been drilled. The device in the Smith Patent, for example, is extremely complex and bulky. Thus, it is not adapted for insertion into the $\frac{1}{4}''$ hole formed by drilling of the plug of a mortise-type cylinder lock.

BRIEF DESCRIPTION OF THE INVENTION

In accordance with the present invention, a relatively simple tool has been developed to allow for opening a lock when the proper key is not available, as when the occupant of the premises or public safety officials require access to the premises. The tool, according to the present invention, is generally adapted for use with mortise cylinder-type locks and is generally employable even with recently developed security-type locks which employ mortise cylinders, and other locks, such as those manufactured by Yale, Norwalk, Russwin, and Schlage.

In accordance with the present invention, the center of the plug, or core, of a mortise cylinder-type lock is drilled out. Particularly, with high security-type locks, this may require use of a masonry bit to overcome the more hardened metal which is used in these high security-type locks. However, even with these high security-type locks which employ case hardened steel in various portions to prevent unauthorized access, the case hardened portions which provide the largest part of the security can be avoided by the drilling operation employed as a prerequisite to use of the tool of the present invention. The hole which is drilled in the lock is generally in the cylinder plug to allow insertion of the tool of the present invention, and its use to act as the cam located on the rear of the cylinder which actuates the bolt of the lock.

Specifically, the lock opening device of the present invention comprises an elongated hollow member, particularly a cylindrical tube. While any elongated hollow member can be employed in accordance with the present invention, the invention will be described henceforth with relation to a cylindrical tube. One diameter of the tube remains open, while the other end is closed by appropriate means. One method for accomplishing the closing of the diameter is with a soldered plug. Obviously, other means to accomplish the closing of this end, and to require a piece of spring steel to change direction at that point, can equally well be employed. A piece of spring steel, which has been stressed at least along one end to allow for bending at, essentially, a 90° angle is inserted through the open diameter of the cylinder, the end of the spring steel within the tube being guided into engagement with an opening formed in the circumference of the cylinder adjacent the plug end. The piece of spring steel which remains extending from the open diameter may be provided with a plastic covering, or other suitable handle means. When the spring steel member is pushed further into the cylinder, the end which is in engagement with the opening on the circumference extends from this cylindrical member, essentially at a right angle. This extending "finger" is able to engage the lock tongue in the same manner that the cam normally would, if the proper key were available, the cam being bypassed by the method and apparatus of the present invention. This acts to actuate and open the bolt of the lock, withdrawing it from the strike plate.

The lock opening tool can be provided with markings to indicate the depth of insertion into the lock so as to determine that there has been sufficient, and neither excessive nor insufficient, insertion relative to the length of the drilled opening in the mortise cylinder body.

DESCRIPTION OF THE PREFERRED EMBODIMENTS

Figure 1:
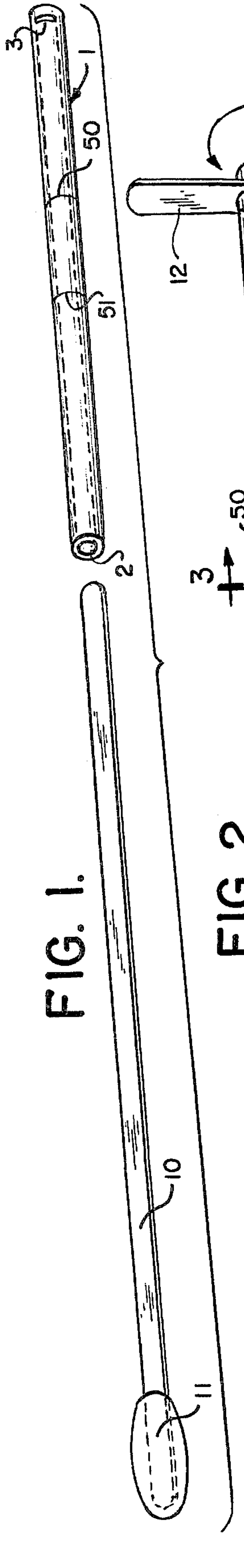
FIG. 1 is an assembly view of the elongated hollow member, in this case a cylindrical tube, of the present invention and the spring steel member.
Figure 5:
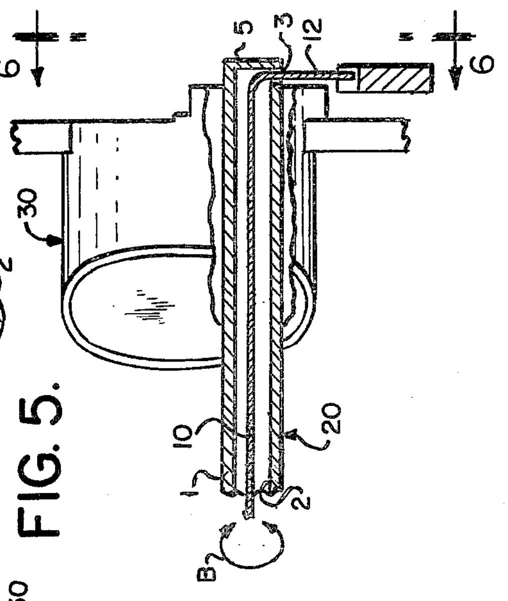
FIG. 5 is a view of the cylindrical lock device illustrated in FIG. 4, partially broken away, with the tool of the present invention, in section, inserted into said lock device.

Referring to the accompanying drawings, the parts of the lock opening tool of the present invention are illustrated in FIG. 1. These parts include an elongated hollow member, particularly a cylindrical tube 1 having an opening along a diameter 2 and an opening along the circumference 3, the circumferential opening being at the end opposite the diametrical opening. As illustrated in FIG. 5, the end of the cylindrical tube 1 opposite the diametrical opening 2 is provided with a plug 5. This plug can take any suitable form, such as a plug of solder. Further, if a solid piece of one quarter inch diameter steel stock is hollowed out in order to form the lock opening tool of the present invention, a flat ended drill can be employed, this drill not proceeding all the way through the piece of stock, so as to leave a plug at the end. Obviously, any means can be employed for closing that end of the tube or bore, so long as a 90° angle in the spring steel being inserted from the diametrical opening is achieved.

The second part of the lock opening tool of the present invention includes a strip of spring steel 10 to which may be attached a handle operating device 11. This handle operating device can, for example, be merely a knob of plastic to aid in grasping the piece of spring steel. A slight bend is placed in this flat piece of spring steel 10 such that when it exits from circumferential opening 3 in the cylindrical tube 1, the spring steel exits at an angle of 90° to 115°.

Figure 2:
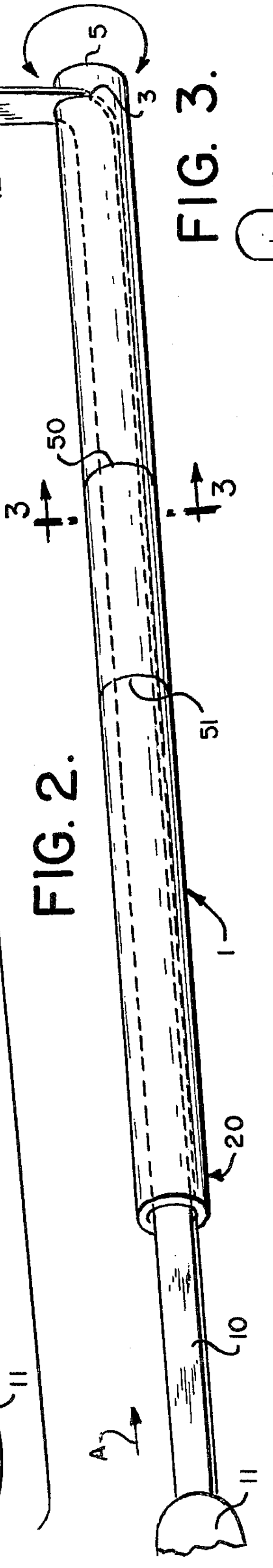
FIG. 2 is a plan view of the device of the present invention, shown partially in phantom.
Figure 3:
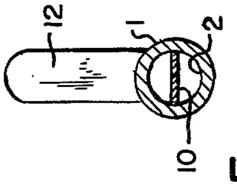
FIG. 3 is a sectional view along the line 3—3 of FIG. 2.

To form the completed tool 20 of the present invention, the flat strip of spring steel 10 is inserted into the cylindrical tube 1, with the handle portion 11 of the strip of spring steel not entering the cylindrical body of the tube. While as illustrated in FIG. 2, the end 12 of the flat strip of spring steel extends from the circumferential opening 3, this is not the initial form of the tool for insertion into a cylinder lock device. Rather, the end 12 of the flat strip steel is adjacent the opening 3 of the cylindrical tubular member, but does not extend from it until a later point in the use of the tool.

Figure 4:
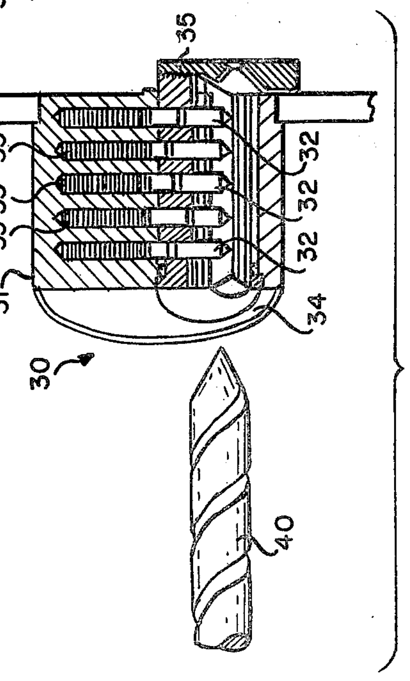
FIG. 4 is a sectional view of a cylindrical lock on which the tool of the present invention is operable, with a drill bit shown in preparation for removing a portion of the cylindrical lock.

When a mortise cylinder-type lock must be opened without the benefit of a key, an opening is first drilled in that lock. A representative cylinder-type lock 30 as illustrated in FIG. 4. This lock includes a body portion 31 within which are mounted tumblers 32 actuated by tumbler springs 33. The tumbler springs 33 act to urge the tumblers 32 against the bottom surface of the cylinder and to allow movement of the tumblers in response to insertion of the proper key. The cylinder portion of the lock is illustrated at 34 and it is within this cylinder that the tumblers 32 are located. At the rear of the cylinder lock is a cam member 35. Under normal operating conditions, when a key is inserted into a slot in the cylinder, the tumblers are moved to the proper location to allow rotation of the cylinder plug and the cam member which is attached to the rear of the plug, movement of the cam member 35 resulting in withdrawal of the bolt 36 of the lock from the strike plate.

When the lock must be opened without the benefit of the proper key, the cylinder 34 must be drilled out. This removal by drilling of the cylinder is represented in FIG. 4 by placement of drill bit 40.

In many mortise cylinder-type locks, the cylinder is formed of such a material that a standard metal bit can be employed for drilling out the lock. However, particularly with many high security-type locks, even a metal drill bit is insufficient. In those cases, the drill bit 40 must be of a masonry type. The masonry-type is employed for the initial drilling operation and a standard metal drill bit can then be employed for smoothing once the hardened metal is drilled through. Generally, for this drilling operation, a one-half inch slow speed drill is required in order to achieve sufficient torque.

The cylinders of commercial locks are of two different lengths, in general; the shorter cylinders having a length of 1 25/64 inch (known in the art as a 1⅜ inch cylinder) and the others 1 35/64 inch (known in the art as a 1¼ inch cylinder). Obviously, the drill employed to drill out the cylinder lock need not be inserted any further than the length of the actual cylinder. To avoid an overdrilling of the lock, a piece of tape is generally placed the shortest distance, i.e., 1 25/64 inch, away from the cutting tip of the drill bit. Drilling is then carried out until this piece of tape is adjacent the front face of the lock where the drilling has started. If, after the lock has been drilled to that point, the counterpart lock mounted inside the door cannot be seen with the aid of a flashlight through the hole, then, obviously, the cylinder lock is of the longer type and a tape is again placed upon the drill bit at 1 35/64 inch from the cutting edge. Additional drilling is then accomplished to this point.

After a hole of the proper depth has been drilled, the hole may be smoothed, as necessary, as with a standard metal drilling bit after the masonry bit. Further, particularly if the lock is an old one which has ceased to operate smoothly, a lock lubricant can be sprayed or otherwise placed within the opening which has been drilled. The lubricant will free the dry or binding parts inside the lock into which the mortise cylinder is screwed.

The lock opening tool 20 of the present invention, with the spring steel strip 10 withdrawn, is then inserted into the opening up to one of the indicating marks 50 or 51 provided on the outside of the cylindrical tube 1. These indicating marks are provided at such a point that the circumferential opening 3 on the cylindrical tube 1 is beyond the lock body 31 and the cam member 35. These indicating marks 50 and 51 are in alignment with the circumferential opening 3. Depending upon whether the door is a right or left hand mount, the cylindrical tube 1 is then rotated 90° to the left or right, generally to the opposite hand compared with the mount, i.e., to the left for a right hand mount and to the right for a left hand mount.

Figure 6:
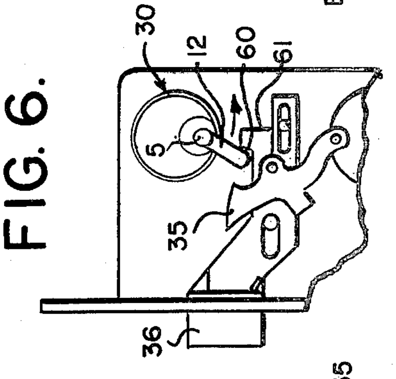
FIG. 6 is a view along the lines 6—6 of FIG. 5.

The insertion of the lock opening tool 20 into the drilled out lock 30, to the proper depth, is indicated in FIGS. 5 and 6. Once the cylindrical tube 1 has been inserted into the drilled out lock 30 to the proper extent, the end 12 of the strip of spring steel is extended through the circumferential opening 3 by moving the spring strip 10 in the direction of the arrow A, with aid of the handle portion 11. Because the cams used by various lock manufacturers are of different lengths, the specific amount of insertion of the strip 10 into the tube, i.e., the specific amount of extension of the end 12 from the circumferential opening 3 of the tube, cannot be determined in advance, but can be determined, only, by trial and error. The extension of the end 12 through the circumferential opening 3 will allow the end 12 to engage with the lock cylinder counterpart which provides for opening of the lock. This process bypasses the use of the cam which is mounted on the back of the lock cylinder. The end 12 of the strip 10 engages in a notch 60, which the cam normally engages. Turning of the tool 20 causes the mechanism 61 to move to the right, as illustrated in FIG. 6, thus accomplishing withdrawal of the bolt 36 from the strike plate (not shown). Opening of the lock is accomplished to rotation of the cylindrical tube 1 either to the right or left, as indicated by arrow B in FIG. 5. If necessary, of course, a pliers may be placed around the cylindrical tube 1 to aid in turning it.

Merely as an illustration, appropriate dimensions for a lock opening tool according to the present invention are as follows:

| | |
|---|---|
| Outside diameter of cylindrical tube 1 | ¼ inch |
| Inside diameter of cylindrical tube 1 | 3/16 inch |
| Width of spring steel strip 10 | 5/32 inch |
| Length of spring steel strip 10 | 7 inches |
| Dimensions of circumferential opening 3 | 0.155 inch × 0.097 inch |
| Thickness of plug 5 | 0.020 inch |

A tool for use in opening a lock when the appropriate key is not available has thus been described. The invention should not be considered as limited to the specific tool illustrated and described, but only as limited in the appended claims. For example, the spring steel strip 10 may be inserted at the first end through a second circumferential opening, rather than being inserted through a diametrical opening. Further, while the invention has been described with regard to a cylindrical tube, it should be obvious that any elongated hollow member, whether square, hexagonal, or of some other geometric configuration, can be employed in place of the cylindrical tool which has been described.

I claim:

1. A process for opening a mortise cylinder-type lock without a key comprising:

a. drilling a hole through the cylinder of said lock;

b. inserting into said hole an elongated, hollow member having a first opening at one end and a circumferential opening at the opposite end, a strip of spring steel being inserted through said first opening to said circumferential opening.

c. inserting said elongated member within said hole formed in said lock until the circumferential opening extends beyond the lock body;

d. extending said spring steel strip through said circumferential opening to engage the end of said strip with the lock cylinder counterpart; and e. turning said elongated member so that the end of said steel strip engaged with said lock cylinder counterparts opens the lock.

2. The process of claim 1 wherein said first opening is a diametrical opening.

3. The process of claim 1 wherein said elongated hollow member is a cylindrical tube.

* * * * *